US006986028B2

(12) United States Patent  (10) Patent No.: US 6,986,028 B2
Ehlig et al.  (45) Date of Patent:  Jan. 10, 2006

(54) REPEAT BLOCK WITH ZERO CYCLE OVERHEAD NESTING

(75) Inventors: Peter N. Ehlig, Sugarland, TX (US); Alexander Tessarolo, Sydney (AU)

(73) Assignee: Texas Instruments Incorporated, Dallas, TX (US)

( * ) Notice: Subject to any disclaimer, the term of this patent is extended or adjusted under 35 U.S.C. 154(b) by 520 days.

(21) Appl. No.: 10/196,915

(22) Filed: Jul. 17, 2002

(65) Prior Publication Data

US 2003/0200423 A1    Oct. 23, 2003

Related U.S. Application Data

(60) Provisional application No. 60/374,419, filed on Apr. 22, 2002.

(51) Int. Cl.
*G06F 9/40*   (2006.01)
(52) U.S. Cl. ............... 712/241; 712/228; 712/229; 712/244
(58) Field of Classification Search ........... 712/241, 712/30, 43, 228, 229, 244; 710/260, 261
See application file for complete search history.

(56) References Cited

U.S. PATENT DOCUMENTS

| 3,168,724 | A | * | 2/1965 | Anderson | .................. 712/228 |
| 4,713,749 | A |   | 12/1987 | Magar et al. | |
| 5,036,458 | A | * | 7/1991 | Matsushima et al. | ....... 712/244 |
| 5,530,873 | A | * | 6/1996 | Takano | ....................... 710/260 |
| 5,579,493 | A | * | 11/1996 | Kiuchi et al. | ............... 712/207 |
| 6,038,649 | A |   | 3/2000 | Ozawa et al. | |
| 6,243,804 | B1 | * | 6/2001 | Cheng | ........................ 712/228 |
| 6,560,697 | B2 | * | 5/2003 | Sato | .......................... 712/245 |

FOREIGN PATENT DOCUMENTS

EP    1182570 A2  *  2/2002

* cited by examiner

*Primary Examiner*—William M. Treat
(74) *Attorney, Agent, or Firm*—Robert D. Marshall, Jr.; W. James Brady, III; Frederick J. Telecky, Jr.

(57) ABSTRACT

A digital system is provided with means and methods for executing an instruction type wherein context information that pertains to that type instruction is automatically saved and restored during execution of the instruction type.

10 Claims, 5 Drawing Sheets

| F1 | F2 | D1 | D2 | R1 | R2 | E | W | CYCLE |
|----|----|----|----|----|----|---|---|-------|
| I1 |    |    |    |    |    |   |   | 1 |
| I2 | I1 |    |    |    |    |   |   | 2 |
| I3 | I2 | I1 |    |    |    |   |   | 3 |
| I4 | I3 | I2 | I1 |    |    |   |   | 4 |
| I5 | I4 | I3 | I2 | I1 |    |   |   | 5 |
| I6 | I5 | I4 | I3 | I2 | I1 |   |   | 6 |
| I7 | I6 | I5 | I4 | I3 | I2 | I1 |   | 7 |
| I8 | I7 | I6 | I5 | I4 | I3 | I2 | I1 | 8 |
|    | I8 | I7 | I6 | I5 | I4 | I3 | I2 | 9 |
|    |    | I8 | I7 | I6 | I5 | I4 | I3 | 10 |
|    |    |    | I8 | I7 | I6 | I5 | I4 | 11 |
|    |    |    |    | I8 | I7 | I6 | I5 | 12 |
|    |    |    |    |    | I8 | I7 | I6 | 13 |
|    |    |    |    |    |    | I8 | I7 | 14 |
|    |    |    |    |    |    |    | I8 | 15 |

US 6,986,028 B2

REPEAT BLOCK WITH ZERO CYCLE OVERHEAD NESTING

This application claims priority under 35 USC §119(e)(1) of Provisional Application No. 60/374,419, filed Apr. 22, 2002.

FIELD OF THE INVENTION

This invention generally relates to microprocessors, and more specifically to improvements in execution of instruction loops, circuits, systems, and methods of making.

BACKGROUND OF THE INVENTION

Microprocessors are general-purpose processors that provide high instruction throughputs in order to execute software running thereon, and can have a wide range of processing requirements depending on the particular software applications involved. Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever increasing DSP performance while keeping power consumption as low as possible.

When programming time-critical high-computational tasks, it is often necessary to repeat the same operation many times. For example, in a DSP described in U.S. Pat. No. 4,713,749, a repeat instruction (RPT) provides for code compacting and reducing the branch overheads. The repeat feature allows a single instruction to be performed up to N+1 times. In this embodiment, N is defined by an eight-bit repeat counter RPTC, which is loaded by the RPT or RPTK instructions via a data bus with either a data memory value (via an RPT instruction) or an immediate value (RPTK instruction). The value of this operand is one less than the number of times that the next instruction is executed. The instruction immediately following is then executed, and the RPTC register is decremented until it reaches zero. When using the repeat feature, the instruction being repeated is fetched only once. As a result, many multicycle instructions become one or two cycle when they are repeated. The repeat feature can be used with instructions such as multiply/accumulates (MACD), block moves, I/O transfers, and table read/writes. Those instructions that are normally multicycle are pipelined when using the repeat feature, and effectively become single-cycle instructions. Programs, such as filter implementation, require loops that can be controlled in as little time as possible. For example, a 50-tap transversal filter code can be defined by two instructions, RPTK 49 and MACD.

In certain digital signal processors, hardware is provided which will repeat a block of code a specified number of times, with zero cycle overhead after the first iteration through the block of code. In all cases to date, this hardware can only work on one block of code at a time and nesting is only supported if registers are manually saved, which is inefficient in cycles.

SUMMARY OF THE INVENTION

Particular and preferred aspects of the invention are set out in the accompanying independent and dependent claims. In general, and in a form of the present invention, a digital system is provided with means and methods for executing an instruction type wherein context information that pertains to that type instruction is automatically saved and restored during execution of the instruction.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the digital system of FIG. 1, unless otherwise stated, and in which.

Corresponding numerals and symbols in the different figures and tables refer to corresponding parts unless otherwise indicated.

DETAILED DESCRIPTION OF EMBODIMENTS OF THE INVENTION

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 1:
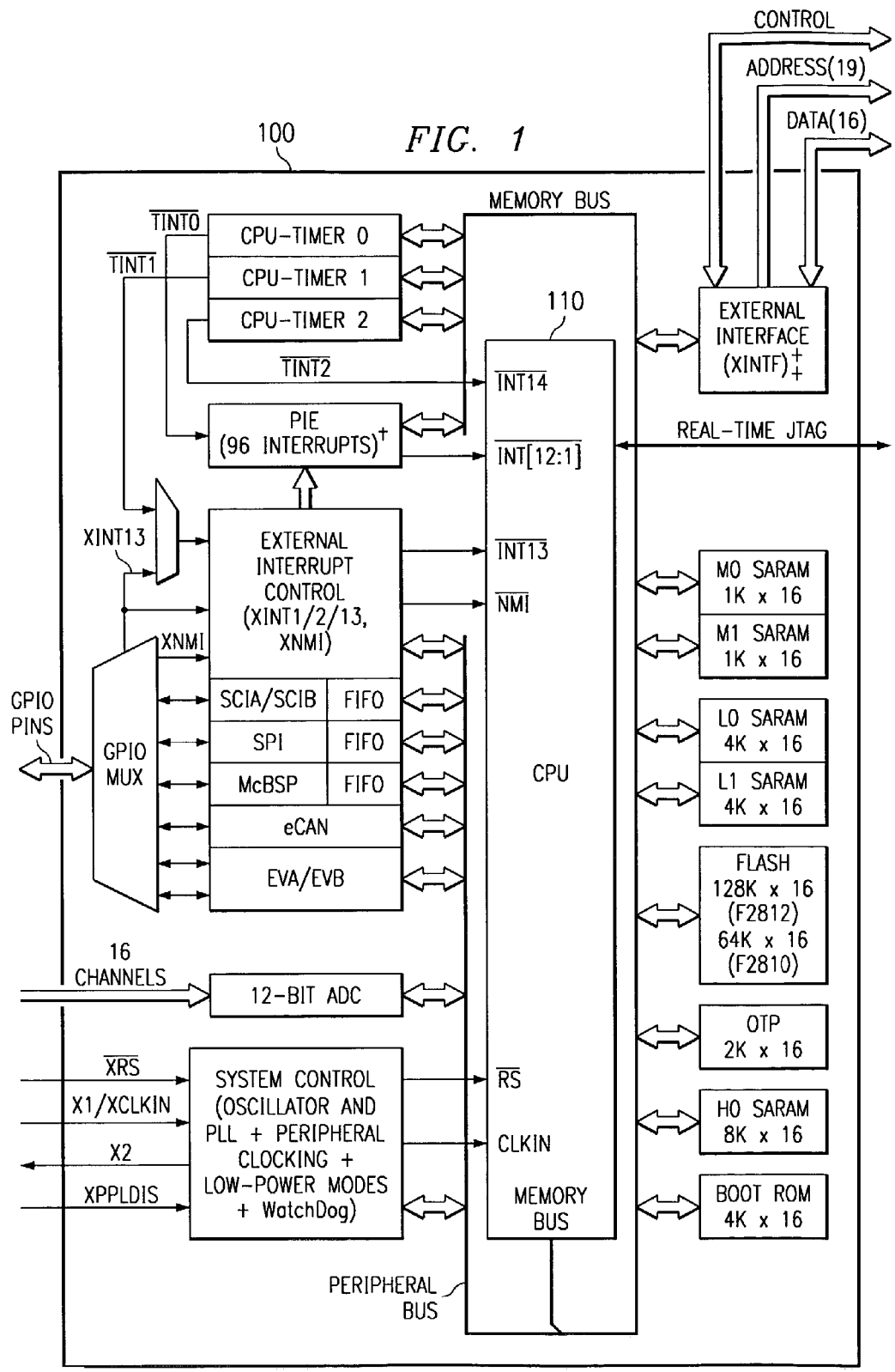
FIG. 1 is a block diagram of a digital system that includes an embodiment of the present invention.

FIG. 1 is a block diagram of a digital system that includes an embodiment of the present invention in a megacell 100 having a processor core 110 and several peripheral devices. In the interest of clarity, FIG. 1 only shows those portions of megacell 100 that are relevant to an understanding of an embodiment of the present invention. Details of general construction for DSPs are well known, and may be found readily elsewhere. For example, U.S. Pat. No. 4,713,749 issued to Magar Surendar, et al, entitled *Microprocessor with Repeat Instruction*, describes a DSP in detail. U.S. Pat. No. 5,329,471 issued to Gary Swoboda, et al, describes in detail how to test and emulate a DSP. Details of portions of megacell 100 relevant to an embodiment of the present invention are explained in sufficient detail herein below, so as to enable one of ordinary skill in the microprocessor art to make and use the invention.

Referring still to FIG. 1, processor core 110 is a DSP and will be described in more detail later. Several blocks of memory are connected to processor 110, including 128K×16 of embedded Flash memory (Flash) and 2K×16 of one time programmable memory (OTP), two blocks of single access memory (M0, M1 SARAM), each 1K×16 in size, and an additional 16K×16 of single-access RAM, divided into 3 blocks L0, L1, H0 (4K+4K+8K). The memory blocks connected to processor 110 are mapped to both program and data space. Hence, the user can use them to execute code or for data variables. The partitioning is performed within a program linker. Processor 110 presents a unified memory map to the programmer. This makes for easier programming in high-level languages. A Boot ROM is factory programmed with boot loading software.

A peripheral interrupt expansion (PIE) block serves to multiplex numerous interrupt sources into a smaller set of interrupt inputs. The PIE block can support up to 96 peripheral interrupts. Each of the 96 interrupts is, supported by its own vector stored in a dedicated RAM block that can be overwritten by the user. The vector is, automatically fetched by the CPU on servicing the interrupt. In this embodiment, it takes nine CPU 110 clock cycles to fetch the vector and save critical CPU 110 registers. Hence the CPU can quickly respond to interrupt events. Prioritization of interrupts is controlled in hardware and software. Each individual interrupt can be enabled/disabled within the PIE block.

An external interface (XINTF) with programmable wait-state, chip-select and programmable strobe timing enables glue-less interface to external memories and peripherals. Most of the peripheral signals are multiplexed with general-purpose I/O (GPIO) signals. This enables the user to use a pin as GPIO if the peripheral signal or function is not used.

Figures 2, 3:
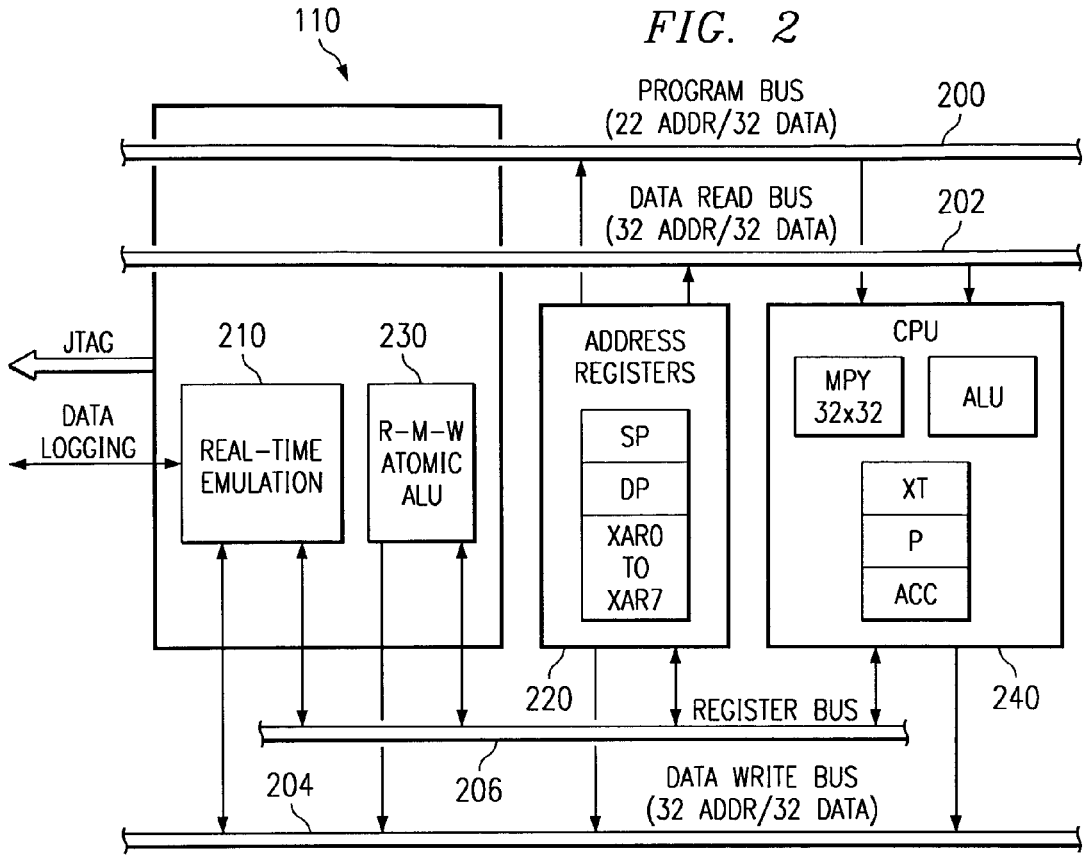
FIG. 2 is a block diagram of a processor core within the system of FIG. 1.
FIG. 3 is a timing diagram illustrating operation of an instruction pipeline in the processor of FIG. 2.

FIG. 2 is a block diagram of a processor core 110 within the system of FIG. 1. Processor core 110 is a low-cost 32-bit fixed-point digital signal processor (DSP). Processor 110 provides single-cycle instruction execution, register-to-register operations, and modified Harvard architecture (usable in Von Neumann mode). Other features include circular address capability, byte packing and unpacking, and bit manipulation instructions. The modified Harvard architecture of the CPU enables instruction and data fetches to be performed in parallel. The CPU can read instructions and data while it writes data simultaneously to maintain the single-cycle instruction operation across the pipeline. The CPU does this over six separate address/data buses 200, 202, 204. An operand bus supplies the values for multiplier, shifter, and ALU operations, and register bus 206 carries the results to registers and memory. Program and data control logic stores a queue of instructions that have been fetched from program memory. Real-Time emulation and visibility circuitry 210 provides control and interfaces for program development tools. Address register arithmetic unit (ARAU) 220 generates addresses for values that must be fetched from data memory. For a data read, it places the address on the data-read address bus 202; for a data writes, it loads the data-write address bus 204. The ARAU also increments or decrements the stack pointer (SP) and the auxiliary registers (XAR0, XAR1, XAR2, XAR3, XAR4, XAR5, XAR6, and XAR7). A data page pointer (DP) register provides extended address reach by appending more significant address bits to a data address.

Atomic read-modify-write arithmetic logic unit (ALU) 230 is a 32-bit ALU that performs 2s-complement arithmetic and Boolean logic operations. Before doing its calculations, the ALU accepts data from registers, from data memory, or from the program control logic. The ALU saves results to a register or to data memory. Fixed-point multiplier/ALU (MPY/ALU) 240 performs 32-bit by 32-bit 2s-complement multiplication with a 64-bit result. The multiplier is connected to a 32-bit multiplicand register (XT), a 32-bit product register (P), and a 32-bit accumulator (ACC). The XT register supplies one of the values to be multiplied. The result of the multiplication can be sent to the P register or to ACC.

The stack pointer (SP) enables the use of a software stack in data memory. The stack pointer has only 16 bits and can only address the low 64K of data space. When the SP is used, the upper six bits of the 32-bit address are forced to 0. During operation, the stack grows from low memory to high memory. The SP always points to the next empty location in the stack. At reset, the SP is initialized, so that it points to address 0000 0400$_{16}$. When 32-bit values are saved to the stack, the least significant 16 bits are saved first, and the most significant 16 bits are saved to the next higher address (little endian format). When 32-bit operations read or write a 32-bit value, the CPU expects the memory wrapper or peripheral-interface logic to align that read or write to an even address. For example, if the SP contains the odd address 0000 0083$_{16}$, a 32-bit read operation reads from addresses 0000 0082$_{16}$ and 0000 0083$_{16}$.

The SP overflows if its value is increased beyond FFFF$_{16}$ or decreased below 0000$_{16}$. When the SP increases past FFFF, it counts forward from 0000. For example, if SP=FFFE and an instruction adds 3 to the SP, the result is 0001. When the SP decreases past 0000, it counts backward from FFFF. For example, if SP=0002 and an instruction subtracts 4 from SP, the result is FFFE. When values are being saved to the stack, the SP is not forced to align with even or odd addresses. Alignment is forced by the memory wrapper or peripheral-interface logic.

FIG. 3 is a timing diagram illustrating operation of an instruction pipeline in the processor of FIG. 2. Each instruction passes through eight independent phases that form an instruction pipeline. Reads from memory are designed to be pipelined in two stages, which correspond to the two pipeline phases used by the CPU for each memory-read operation. At any given time, up to eight instructions may be active, each in a different phase of completion. Not all reads and writes happen in the same phases, but a pipeline-protection mechanism stalls instructions as needed to ensure that reads and writes to the same location happen in the order in which they are programmed. Table 1 provides further information regarding the instruction pipeline phases of this embodiment. It should be understood that the number and operation of the various phase may be different in other embodiments of the invention.

TABLE 1

Instruction Pipeline Phases

| | |
|---|---|
| Fetch 1 (F1) | In the fetch 1 (F1) phase, the CPU drives a program-memory address on the 22-bit program address bus 200. |
| Fetch 2 (F2) | In the fetch 2 (F2) phase, the CPU reads from program memory by way of the 32-bit program-read data bus 200, and loads the instruction(s) into an instruction-fetch queue |

TABLE 1-continued

Instruction Pipeline Phases

| | |
|---|---|
| Decode 1 (D1) | The processor supports both 32-bit and 16-bit instructions and an instruction can be aligned to an even or odd address. The decode 1 (D1) hardware identifies instruction boundaries in the instruction-fetch queue and determines the size of the next instruction to be executed. It also determines whether the instruction is a legal instruction. |
| Decode 2 (D2) | The decode 2 (D2) hardware requests an instruction from the instruction-fetch queue. The requested instruction is loaded into the instruction register, where decoding is completed. Once an instruction reaches the D2 phase, it runs to completion. In this pipeline phase, the following tasks are performed: _ If data is to be read from memory, the CPU generates the source address or addresses._ If data is to be written to memory, the CPU generates the destination address. _ The address register arithmetic unit (ARAU) performs any required modifications to the stack pointer (SP) or to an auxiliary register and/or the auxiliary register pointer (ARP). If a program-flow discontinuity (such as a branch or an illegal-instruction trap) is required, it is taken. |
| Read 1 (R1) | If data is to be read from memory, the read 1 (R1) hardware drives the address(es) on the appropriate address bus(es). |
| Read 2 (R2) | If data was addressed in the R1 phase, the read 2 (R2) hardware fetches that data by way of the appropriate data bus(es). |
| Execute (E) | In the execute (E) phase, the CPU performs all multiplier, shifter, and ALU operations. This includes all the prime arithmetic and logic operations involving the accumulator and product register. For operations that involve reading a value, modifying it, and writing it back to the original location, the modification (typically an arithmetic or a logical operation) is performed during the E phase of the pipeline. Any CPU register values used by the multiplier, shifter, and ALU are read from the registers at the beginning of the E phase. A result that is to be written to a CPU register is written to the register at the end of the E phase. |
| Write (W) | If a transferred value or result is to be written to memory, the write occurs in the write (W) phase. The CPU drives the destination address, the appropriate write strobes, and the data to be written. The actual storing of data during a write, which takes at least one more clock cycle, is handled by memory wrappers or peripheral interface logic and is not visible as a part of the CPU pipeline |

To maximize pipeline efficiency, an instruction-fetch mechanism attempts to keep the pipeline full. Its role is to fill an instruction-fetch queue, which holds instructions in preparation for decoding and execution. The instruction-fetch mechanism fetches 32-bits at a time from program memory; it fetches one 32-bit instruction or two 16-bit instructions. The instruction-fetch mechanism uses three program-address counters: the program counter (PC), the instruction counter (IC), and the fetch counter (FC). When the pipeline is full, the PC will always point to the instruction in its decode 2 pipeline phase. The IC points to the next instruction to be processed.

Although every instruction passes through the eight phases, not every phase is active for a given instruction. Some instructions complete their operations in the decode 2 phase, others in the execute phase, and still others in the write phase. For example, instructions that do not read from memory perform no operations in the read phases, and instructions that do not write to memory perform no operation in the write phase.

Because different instructions perform modifications to memory and registers during different phases of their completion, an unprotected pipeline could lead to reads and writes at the same location happening out of the intended order. The CPU automatically adds inactive cycles to ensure that these reads and writes happen as intended.

Referring still to FIG. 3, this type of diagram is useful to focus on the path of each instruction rather than on specific pipeline events. In cycle 8, the pipeline is full: there is an instruction in every pipeline phase. Also, the effective execution time for each of these instructions is one cycle. Some instructions finish their activity at the D2 phase, some at the E phase, and some at the W phase.

Figure 4:
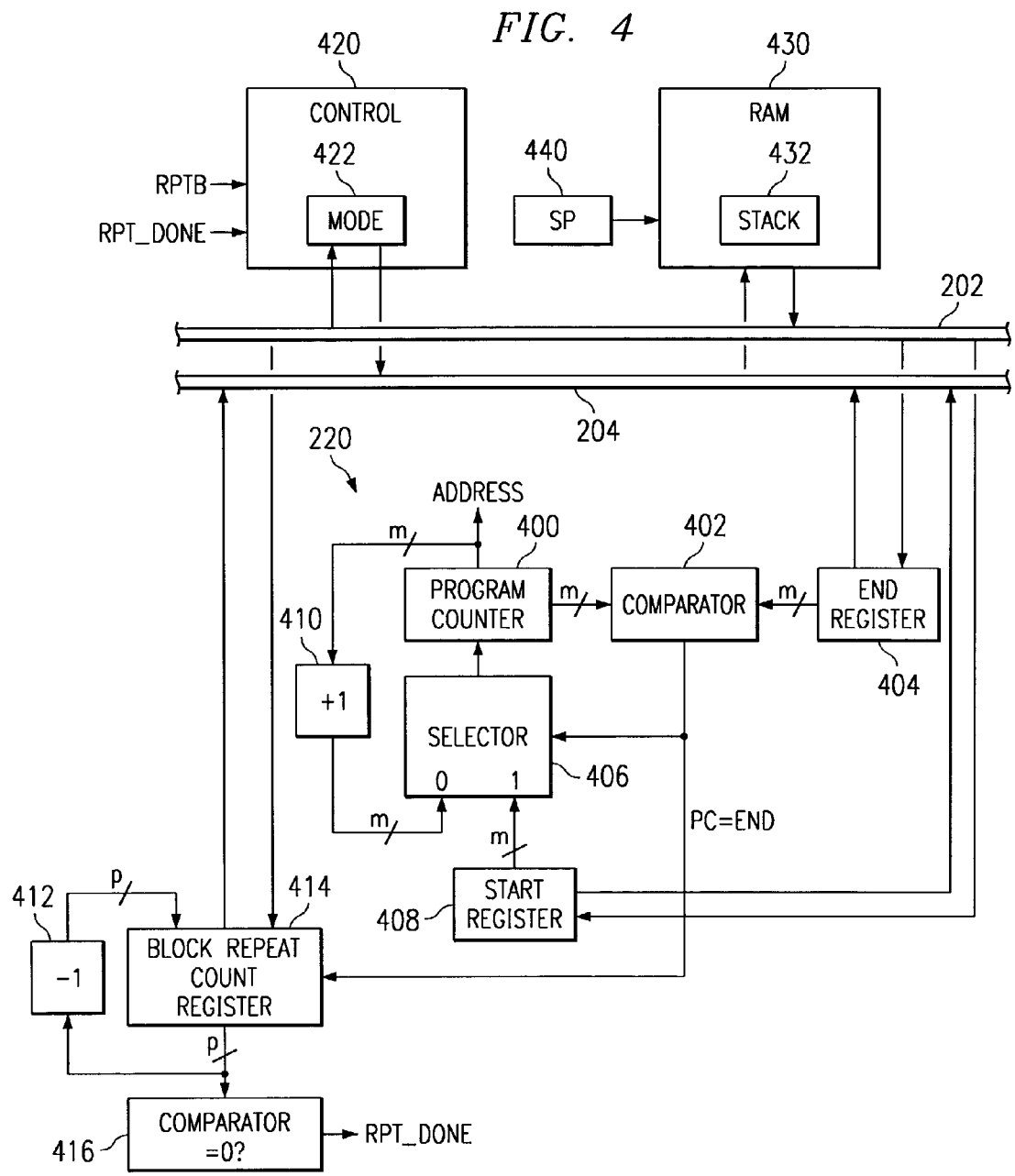
FIG. 4 is a block diagram of a portion the address unit of the processor of FIG. 2 illustrating circuitry for performing a block repeat instruction according to aspects of the present invention.

FIG. 4 is a block diagram of a portion of address unit 220 illustrating circuitry for performing a block repeat instruction according to aspects of the present invention. There are cases in which it is necessary to repeatedly execute a program stored in the prescribed memory region a prescribed number of times. When access is made to the prescribed memory region (block repeat access), the so-called block repeat addressing method is adopted for addressing. This portion of address generating circuit 220 includes program counter (PC) 400, comparators 402 and 416, end register 404, selector 406, start register 408, up counter 410, down counter 412, and repeat block counter register 414.

First of all, when a block repeat (RPTB) instruction is fetched and decoded, before execution of the block repeat operation, the bottom address (end address) of a program block for repeated execution is set in register 404, the top address (front address) of the program is set in register 408, and the cycle repetition number is set as the initial value in register 414.

After the start of the block repeat operation, an address is generated from program counter 400 sequentially for each instruction within the repeated block. This address is fed to a program memory (not shown in the figure) and up counter 410, and it is also output to comparator 402. In up counter 410, one is added (incremented) to the input address, and the result is output to selector 406.

In comparator 402, comparison is made between the address output from program counter 400 and the bottom address stored in register 404 to determine whether they are equal to each other. While comparator 402 determines that the address of program counter 400 and the bottom address are not identical to each other, PC=END signal is maintained in an inactive state, and selector 406 selects the input 0 side, and output is made to program counter 400. That is, when the address in the period of operation is not equal to the bottom address, the program counter is incremented, and the result is output from program counter 400 as the address of the next sequential instruction of the block operation.

When comparator 402 determines that the address output from program counter 400 is equal to the bottom address, PC=END signal is asserted, selector 406 selects the input 1 side, and output provided to program counter 400 is selected from start register 408. That is, when the address reaches the bottom address, the top address is again output from program counter 400 as the address of the next instruction of the block operation to begin the next iteration of the block of instructions specified by the operands of the RPTB instruction.

In addition, when PC=END signal enters the active state, the cycle repetition number in block count register 414 is subtracted (decremented) by one by means of down counter 412, the decremented value is stored in block count register 414, and it is output to comparator 416. That is, each time one iteration of block addresses is completed by executing the total region of the block repeat program in the direction from the top address to the bottom address, the cycle repetition number stored in register 414 is decremented.

After the aforementioned operation is repeated a prescribed number of cycles, the value in register 414 becomes zero. Comparator 416 compares the cycle repetition number stored in register 414 with zero. If they are equal to each other, a completion signal RPT_DONE is asserted. As the completion signal becomes active, address generating circuit 220 completes the block repeat access operation.

Operation of the RPTB instruction is managed by control circuitry 420. Additionally, a repeat block status flag 422 in a processor status register or a separate dedicated register is required to indicate if the repeat block mechanism is active or not. The repeat block hardware is invoked by the execution of a repeat block instruction, as discussed above, in response to decode signal RPTB from instruction decoding circuitry (not shown). An aspect of the present invention is that when the RPTB instruction begins execution, the current state of the repeat block hardware is saved to stack 432 located in memory 430, which is representative of one of the memory blocks connected to processor 110 in FIG. 1. As discussed earlier, stack pointer 440 maintains the stack. A further aspect of the present invention is that upon completion of the RPTB instruction, the saved state is restored from the stack in response to completion signal RPT_DONE. The state that is automatically saved and restored includes the block start address 408, block end address 404, current repeat count 414 and status information 422 indicating if another block repeat instruction is nested.

Figure 5:
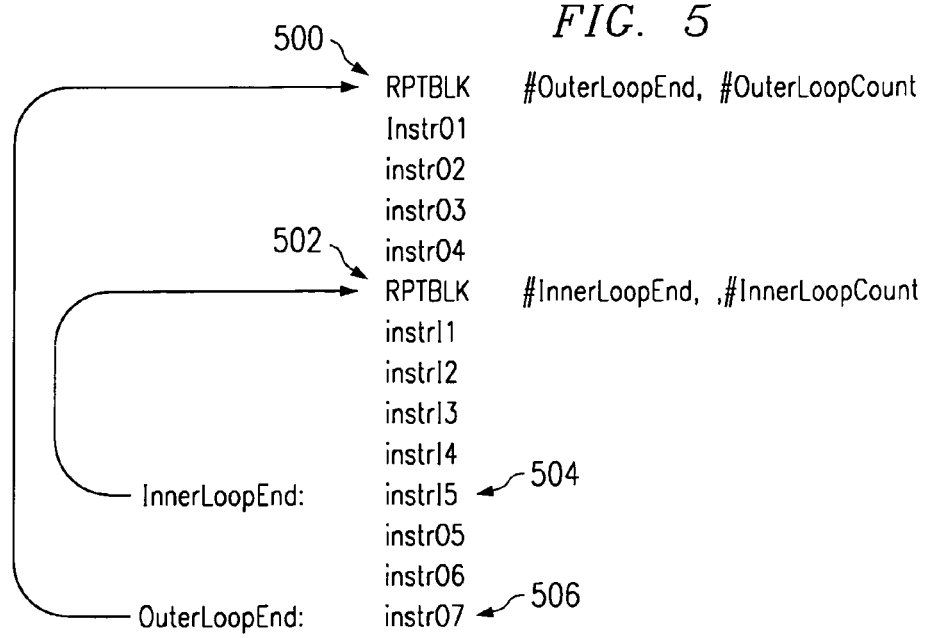
FIG. 5 is a flow chart illustrating execution of nested block repeat instructions in the processor of FIG. 2.

FIG. 5 is a flow chart illustrating execution of nested block repeat instructions. In the snippet of code represented here, repeat block instruction 500 initiates an outer block of instructions that comprise the entire sequence of instructions through instruction 506 labeled "outerLoopEnd." Instruction 500 includes an operand #OuterLoopEnd that represents the address of instruction 506 and a second operand #OuterLoopCount that defines the number of times the outer loop is to be traversed. These two operands are included as immediate data in a first form of the repeat block instruction. In another form, the repeat block instruction specifies two source operand registers that will contain the relevant end address and loop count data. Other embodiments may provide the operands in various manners consistent with the operation of the processor. As described above, when instruction 500 is decoded, the block repeat state information is automatically pushed onto stack 432, then status bit 422 is set to indicate a block repeat instruction 500 is active. The address of the immediately following instruction InstrO1 is then loaded into start register 408, operand #OuterLoopEnd is loaded into end register 404, and second operand #OuterLoopCount is loaded into count register 414.

An inner loop is initiated by repeat block instruction 502 and includes the sequence of instructions through instruction 504. Instruction 502 includes an operand #InnerLoopEnd that represents the address of instruction 504 and a second operand #InnerLoopCount that defines the number of times the inner loop is to be traversed. When instruction 502 is decoded, the block repeat state information that defines the outer loop is automatically pushed onto stack 432, then status bit 422 is set to indicate a block repeat instruction 502 is active. The address of the immediately following instruction InstrI1 is then loaded into start register 408, operand #InnerLoopEnd is loaded into end register 404, and second operand #InnerLoopCount is loaded into count register 414.

In this snippet, the outer loop executes sequentially until the inner loop is initiated at 502. The inner loop repetitions are then fully performed, and execution then continues sequentially until instruction 506. If the outer loop count is not exhausted, then the outer loop is repeated beginning at instruction InstO1. The inner loop repetitions are again fully performed and execution then continues sequentially until instruction 506 as before until the outer loop count is exhausted. In this manner, the inner loop is nested within the outer loop and fully performed during each iteration of the outer loop.

Upon each completion of the inner loop repetitions, the count value block count register 408 becomes zero and signal RPT_DONE is asserted. Execution of block repeat instruction 502 is completed in response to the assertion of signal RPT_DONE by automatically popping the saved state for pending block repeat instruction 500 from stack 432 and restoring this information to start address register 406, end register 404, loop count register 414 and status bit 422. Since restored status bit 422 is thereby asserted to indicate repeat block instruction 500 was pending and is now active, the outer loop is correctly processed. Thus, the outer loop associated with repeat block instruction 500 is performed without disturbance from the nested inner loop associated with repeat block instruction 502.

Advantageously, since state information for the repeat block instruction is saved and restored automatically as part of the execution of each repeat block instruction, no instruction overhead is incurred to save and restore this state information in order to allow correct operation of nested loops.

In this manner, any number of repeat block loops may be nested, up to the extent of the stack size. In the case where no nesting is being done, then the restored status will cause status bit 422 to be de-asserted and no further repeat block processing will be performed after the completion of a non-nested repeat instruction. The procedure of saving and restoring the previous value of the repeat block registers and status flag automatically on the stack is what enables the nesting of multiple repeat blocks.

The saving and restoring of the register contents can be made with zero cycle overhead if the size of the repeat block of code is greater than or equal to the number of cycles it takes to save or restore the registers from the stack. The number of instructions required to meet this condition is dependant on the processor pipeline. For example, in this embodiment the contents of each of the three state registers 404, 408, 416 can be written to the stack via write bus 204 on the same cycle as they are being loaded via read bus 202. In this embodiment, status bit 422 is included as a most significant bit of the value stored for the block count such that the state can be saved in three cycles. Therefore, as long as there are at least three instructions in the repeated loop, the overhead of saving and restoring the block repeat state information is zero. As discussed previously, the instruction pipeline will stall to accommodate shorter loops.

In another embodiment, other means may be provided for automatically saving and restoring state. For example, shadow registers may be provided to temporarily hold contents of registers 404, 408, 414 and/or status bit 422 while saving state so the operands can be loaded into the corresponding active registers.

Figure 6:
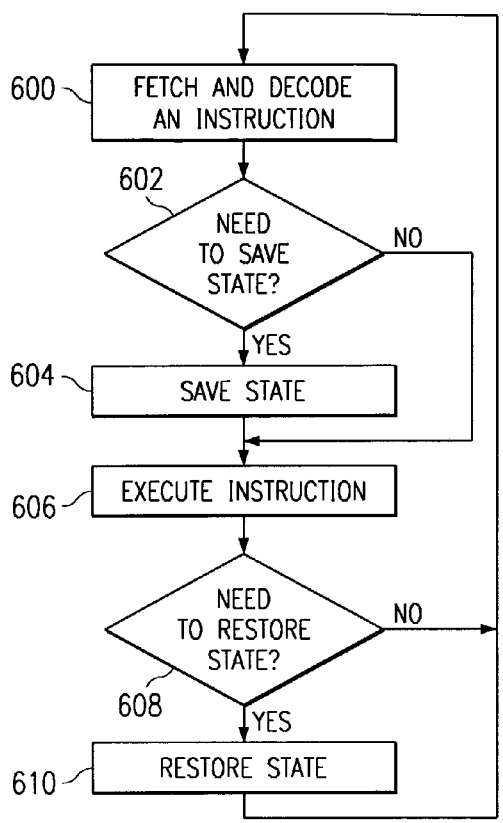
FIG. 6 is a flow chart illustrating execution of an instruction with automatic context storage in the processor of FIG. 2

FIG. 6 is a flow chart illustrating execution of an instruction with automatic context storage according to aspects of the present invention. In step 600, an instruction is fetched and decoded in an instruction pipeline, as described with reference to FIG. 3.

Steps 602–610 represent the execution phases of the instruction, but not on a one for one correspondence. That is, all of these steps may be performed in one cycle or in several cycles depending on the type of instruction. During step 602 a check is made to determine if state should be saved. This test may be conditioned on various factors, such as the type of instruction, or if an interrupt service routine is being performed, for example.

If state should be saved prior to executing this instruction, then it is saved during step 604. The exact state that is saved may vary depending on the type of instruction. For example, for a block repeat instruction described earlier, the state saved comprises a start address, an end address, an iteration count and a status bit indicating a pending RPTB instruction. In another embodiment, another type of instruction, such as a repeat single (RPT) instruction may save only a repeat count value and a RPT-pending status bit indicating that a RPT instruction is pending, for example.

A RPT instruction allows the execution of a single instruction (N+1) times, where N is specified as an operand of the RPT instruction. The following instruction is executed once and then repeated N times. When RPT is executed, a repeat counter (RPTC) is loaded with N. RPTC is then decremented every time the repeated instruction is executed, until RPTC equals 0. This may be the same or a different counter than the block repeat counter.

During state 606 the instruction is executed. For a repeat block instruction, this step includes subsequent iterative execution of all of the instructions within a specified loop. For a RPT instruction, this step includes the repetitive execution of a single instruction. For instruction types that save state, this step also includes setting a status bit to indicate this type instruction is active.

In step 608 a check is made to determine if this instruction type should restore state. As with step 602, this test may be conditioned on various factors, such as the type of instruction, or if an interrupt service routine is being performed, for example. For instance, since a RPT instruction is not nested, there is no need to save and restore state unless this instance of the RPT instruction is being executed in an interrupt service routine. If so, there is a possibility that another RPT instruction was interrupted and therefore RPT state should be saved and restored by this instance of the RPT instruction. Furthermore, the save and restore can be further qualified by the RPT-pending status bit so that the save and restore steps are performed only when a RPT instruction was in fact interrupted.

During step 610 the state is restored, if needed.

Figure 7:
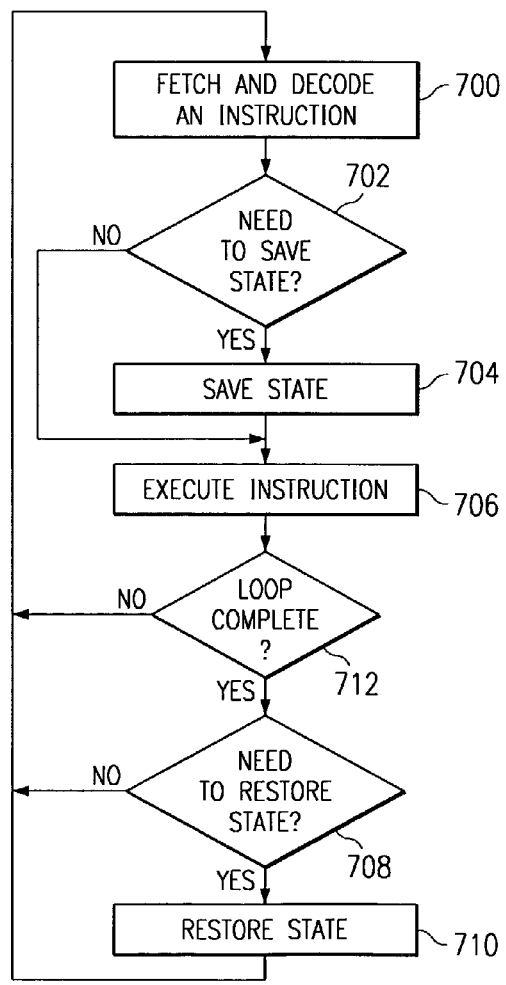
FIG. 7 is a more detailed flow chart illustrating nested execution of an instruction with automatic context storage in the processor of FIG. 2.

FIG. 7 is a flow chart illustrating nested execution of an instruction with automatic context storage according to aspects of the present invention. In this figure, steps 700–710 are the same as corresponding steps 600–610 from FIG. 6.

As mentioned earlier, execution of a RPTB instruction includes subsequent iterative execution of all of the instructions within a loop specified by the operands of the instruction. Step 712 determines if the loop is complete by testing the RPT_DONE signal shown in FIG. 4 as each instruction in the iterative loop is executed.

As illustrated in FIG. 5, a second RPTB instruction 502 can be included within the outer loop to form a nested inner loop. In this case, step 702 saves the context of the outer loop RPTB instruction after decoding inner loop RPTB instruction 502. Then, when step 712 determines that the inner loop is complete after execution of instruction 504, step 708 restores the state of the outer loop RPTB instruction 500 so that the outer loop resumes proper iterative execution.

In a similar manner, in an embodiment in which the RPT instruction uses the same repeat counter as the RPTB instruction, one or more RPT instructions can be nested within a RPTB loop and the RPTB context will be saved and restored automatically each time an RPT instruction is executed within the RPTB loop.

In the state saving mechanism described, the saving and restoring of registers is performed automatically and with generally zero cycle overhead, as discussed earlier. Saving and restoring registers manually as in prior schemes takes extra code and cycles and hence is less efficient. During interrupts, the automatic saving of registers at the invocation of the repeat block instruction means that a programmer does not need to save the repeat block registers and status flag at the beginning and end of an interrupt service routine that uses a repeat block instruction. This is an added performance bonus.

Figure 8:
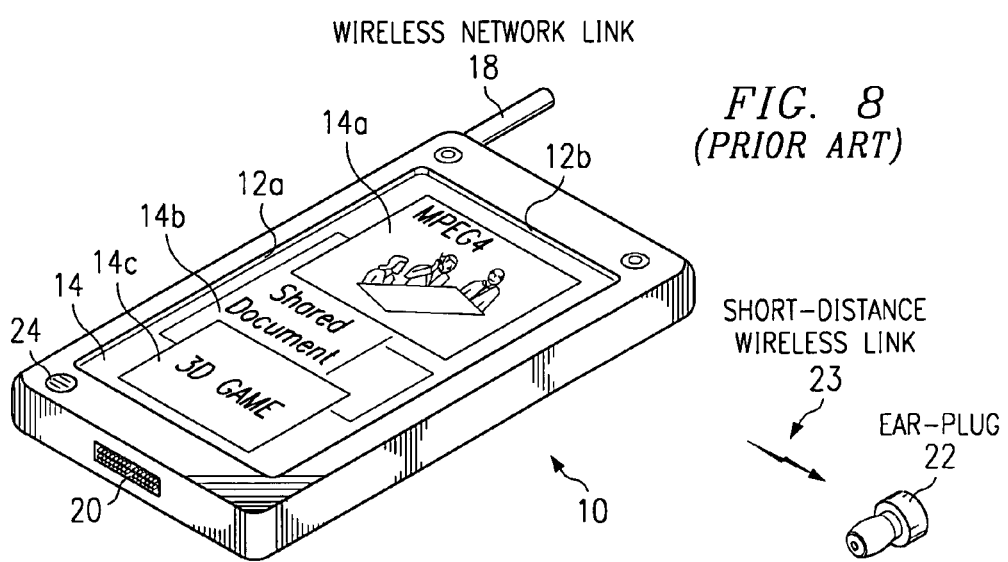
FIG. 8 illustrates an exemplary implementation of such an digital system in a mobile telecommunications device, such as a mobile telephone.

FIG. 8 illustrates an exemplary implementation of such a digital system being a mobile telecommunications device, such as a mobile personal digital assistant (PDA) 10 with display 14 and integrated input sensors 12a, 12b located in the periphery of display 14. As shown in FIG. 8 digital system 10 includes a megacell 100 according to FIG. 1 that is connected to the input sensors 12a,b via an adapter (not shown). A stylus or finger can be used to input information to the PDA via input sensors 12 a,b. Display 14 is connected to megacell 100 via local frame buffer. Display 14 provides graphical and video output in overlapping windows, such as MPEG video window 14a, shared text document window 14b and three dimensional game window 14c, for example.

Radio frequency (RF) circuitry (not shown) is connected to an aerial 18 and is driven by megacell 100 as a DSP peripheral and provides a wireless network link. Connector 20 is connected to a cable adaptor-modem (not shown) and thence to megacell 100 as a DSP peripheral provides a wired network link for use during stationary usage in an office environment, for example. A short distance wireless link 23 is also "connected" to earpiece 22 and is driven by a low power transmitter (not shown) connected to megacell 100 as a DSP peripheral. Microphone 24 is similarly connected to megacell 100 such that two-way audio information can be exchanged with other users on the wireless or wired network using microphone 24 and wireless earpiece 22.

Megacell 100 provides all encoding and decoding for audio and video/graphical information being sent and received via the wireless network link and/or the wire-based network link.

It is contemplated, of course, that many other types of communications systems, control systems and computer systems may also benefit from the present invention, particularly those relying on battery power. Examples of such other computer systems include portable computers, smart phones, web phones, games, toys, and the like. As power dissipation and processing performance is also of concern in desktop and line-powered computer systems and microcontroller applications, particularly from a reliability standpoint, it is also contemplated that the present invention may also provide benefits to such line-powered systems.

Fabrication of digital system 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice that may be sold as bare die or packaged. After packaging, finished parts are biased into an operational state and tested for operational functionality.

Digital system 100 contains hardware extensions for advanced debugging features. These assist in the development of an application system. Since these capabilities are part of the core of CPU 110 itself, they are available utilizing only the JTAG interface with extended operating mode extensions. They provide simple, inexpensive, and speed independent access to the core for sophisticated debugging and economical system development without requiring the costly cabling and access to processor pins required by traditional emulator systems or intruding on system resources.

Thus, a digital system is provided with means and methods for executing an instruction type wherein context information that pertains to that type instruction is automatically saved and restored during execution of the instruction.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, other means for calculating the repeated loop instruction address can be embodied in which nested operation is provided by saving the state of the address calculation means, such as those described in U.S. Pat. No. 6,038,649 entitled "Address Generation Circuit For Block Repeat Addressing For A Pipelined Processor" that is incorporated herein by reference.

In other embodiments, the instruction pipeline may have more or fewer stages than eight. Pipeline stages may be configured and operated in different manners than described herein. Other embodiments may have multiple interconnected execution units.

In another embodiment, the state can be stored elsewhere than in a stack. For example, only a single state save may be provided, or a limited number of states may be saved in a limited storage area. For stack operation, a separate stack and associated stack pointer may be provided from a main stack used for other processor functions. Individual stacks or storage regions may be provided for each type of instruction that performs state saving/restoring operations. Other memory configurations other than 16-bit may be provided, such as a 32-bit organization, for example.

In another embodiment, instructions other than RPTB or RPT may save and restore state. For example, for performance and response reasons, it is beneficial to be able to interrupt any type of instruction that requires multiple execution cycles. Thus, interruptible instructions may then benefit from an automatic state preservation operation so that explicit state preservation does not need to be performed during an interrupt routine. Such instructions could be for performing such tasks as: floating-point calculations, filtering operations, data transfer operations, etc.

It is therefore contemplated that the appended claims will cover any such modifications of the embodiments as fall within the true scope and spirit of the invention.

What is claimed is:

1. A method for executing instructions in a digital system having a processor, comprising the steps of:
   fetching and decoding a first instruction of a first type, wherein a first type instruction requires use of a least a first register of the processor;
   saving first data stored in the first register automatically in response to the step of decoding the first instruction;
   executing the first instruction in a manner that uses the first register;
   restoring the first register with the saved first data automatically after the step of executing;
   setting a mode bit to indicate when the processor is performing an interrupt service routine; and
   conditioning the steps of saving and restoring such that they are performed only when the mode bit indicates an interrupt service routine is being performed.

2. The method of claim 1, further comprising the steps of:
   decoding a second instruction of the first type during the step of executing the first instruction;
   saving second data stored in the first register automatically in response to the step of decoding the second instruction;
   suspending the step of executing of the first instruction;
   executing the second instruction in a manner that uses the first register;
   restoring the first register with the saved second data automatically after the step of executing the second instruction; and
   resuming the step of executing the first instruction.

3. The method of claim 2, wherein the first type instruction is a block repeat instruction and wherein the step of executing the first instruction comprises executing a block of instructions specified by the first instruction and wherein the step of executing the second instruction comprises executing a block of instructions specified by the second instruction.

4. The method of claim 3, wherein the steps of saving first data and saving second data comprise saving a block start address, a block end address and a repeat count and saving status information indicating if another block repeat instruction is pending.

5. The method of claim 1, wherein the step of saving pushes the first data onto a stack and the step of restoring pops the first data from the stack.

6. The method of claim 1, wherein the step of saving comprises saving status information indicating if an instruction of the first type is pending.

7. A method for executing instructions in a digital system having a processor, comprising the steps of:
   fetching and decoding a first instruction of a first type;
   saving first state data automatically in response to the step of decoding the first instruction;
   executing the first instruction in a manner that changes the first state data;
   restoring the saved first state data automatically after the step of executing the first instruction;
   setting a mode bit to indicate when the processor is performing an interrupt service routine; and
   conditioning the steps of saving and restoring such that they are performed only when the mode bit indicates an interrupt service routine is being performed.

8. The method of claim 7, further comprising the steps of:
decoding a second instruction of the first type during the step of executing the first instruction;
saving second state data automatically in response to the step of decoding the second instruction;
suspending the step of executing of the first instruction;
executing the second instruction in a manner that changes the second state data;
restoring the saved second state data automatically after the step of executing the second instruction; and
resuming the step of executing the first instruction.

9. A digital system comprising:
a processor for executing instruction fetched from an instruction memory;
means for decoding each instruction;
means for executing each instruction;
at least a first register for holding state data pertinent to a first type of instruction;
means for saving the state data automatically in response to decoding an instruction of the first type; and
means for restoring the state data after execution of the instruction of the first type;
a mode bit set to indicate when the processor is performing an interrupt service routine;
said means for saving state data is connected to said mode bit and operates to save said state data only when the mode bit indicates an interrupt service routine is being performed; and
said means for restoring state data is connected to said mode bit and operates to restore said state data only when the mode bit indicates an interrupt service routine is being performed.

10. The digital system of claim 9, further comprising a status bit for indicating when the processor has decoded an instruction of the first type; and
wherein data in the status bit is included with the automatically saved state data.

* * * * *